3,213,145
CATALYTIC HYDROGENATION OF ESTERS OF
AROMATIC MONOCARBOXYLIC ACIDS TO
ARYL-SUBSTITUTED METHANOLS
Edmund Field, Chicago, Ill., assignor to Standard Oil
Company, Chicago, Ill., a corporation of Indiana
No Drawing. Filed Mar. 28, 1960, Ser. No. 17,737
11 Claims. (Cl. 260—618)

This invention relates to the reduction of esters of aromatic monocarboxylic acids with hydrogen in the presence of a catalyst and more specifically pertains to the reduction of esters of aromatic monocarboxylic acids with hydrogen in the presence of a copper-containing catalyst for the production of the primary alcohol corresponding to the aromatic monocarboxylic acid.

It is known that esters of aromatic monocarboxylic acids can be reduced with hydrogen in the presence of nickel catalysts and catalysts of similar activity to esters of cycloparaffinic monocarboxylic acid. My discovery is not concerned with the reduction of the aromatic ring unsaturation. Rather my discovery concerns the reduction of the carbonyl group,

of an ester of an aromatic monocarboxylic acid to a carbinol group. Very early work directed to the reduction of a —COOR group, where R is an alkyl hydrocarbon group, to a carbinol group involved the use of sodium and an alcohol. Since this reaction left much to be desired with respect to yields, ease of operation, absence of by-products, and prevention of undesirable side reactions, a search was made by Homer Adkins and his co-workers to find a process for the hydrogenation of esters to the corresponding primary alcohol including effective catalysts and reaction conditions therefor. They did discover a hydrogenation process which utilized copper oxides with or without oxides of other hydrogenating metals and oxides of acid-forming metals, especially chromium oxide. They suggested the use of oxides of alkali and alkaline-earth oxides, especially oxides of barium, calcium or magnesium as promoters. These catalysts were particularly useful at temperatures of 200 to 300° C. and hydrogen pressures of 175 to 300 atmospheres for reducing the aliphatic acid residue to an aliphatic primary alcohol or reducing esters of aryl substituted aliphatic acids such as phenyl substituted propionic, butyric and higher aliphatic acids to phenyl substituted propyl, butyl, etc. higher primary alcohols in relatively high yields.

However, the copper-oxide-containing catalysts proposed by Adkins and co-workers were not as satisfactory for reducing esters of the formula Ar—COOR, wherein Ar is an aromatic group and R is an alkyl hydrocarbon group to an Ar—CH$_2$OH group. The main difficulty with the copper oxide catalysts previously disclosed was that they were not sufficiently selective. The reduction of the more aromatic acid residues went to a high conversion of the corresponding hydrocarbon; i.e., the carbonyl group was reduced all the way to a methyl group and not to a CH$_2$OH group. It has been proposed to minimize the reduction of the carbonyl group to a methyl group by employing a large amount of catalyst and temperatures of about 150 to 180° C. Under such conditions alkyl benzoates could be reduced to about 60 to 65% benzyl alcohol and 35 to 40% toluene when using copper chromite promoted with small amounts of calcium or barium oxides.

A more selective copper-containing catalyst has now been discovered for the reduction of esters of aromatic monocarboxylic acids of the formula Ar—COOR, wherein Ar is an aromatic group and R is an alkyl hydrocarbon group of from 1 to 12 carbon atoms to high yields of the corresponding primary alcohol Ar—CH$_2$OH without substantial production of the hydrocarbon; i.e., Ar—CH$_3$. The more selective copper-containing catalyst is promoted with 0.01 to 1.0 atom of manganese per atom of copper and also contains from 0.01 to 1.0 atom of chromium per atom of copper. This catalyst is useful at temperatures above 50° C. and is especially useful at temperatures in the range of 70 to 180° C. and hydrogen pressures of above 600 p.s.i.g. (40 atmospheres) to pressures as high as 6000 p.s.i.g. (400 atmospheres). The upper portion of the temperature range is useful at the higher pressures, although the selectivity is increased at the lower temperatures; i.e., 70 to 140° C. A preferred combination of temperature and pressure is 120 to 140° C. and 3000 to 5000 p.s.i.g. By employing such a more selective catalyst, the production of, for example, benzyl alcohol from alkyl benzoates in yields above 80 mole percent with less than 10.0 mole percent of toluene being formed can be obtained. Thus there is no substantial reduction of the

group to a methyl group.

The more selective solid copper-containing catalyst can be of two types: supported and unsupported. The latter is prepared from a copper chromite suitably containing from 0.1 to 1 atom of chromium, desirably 0.125 to 0.5 atom of chromium and preferably about 0.165 to 0.2 atom of chromium per atom of copper (suitably 1 to 10 atoms of copper, desirably 2 to 8 atoms of copper and preferably 5 to 6 atoms of copper per atom of chromium, respectively). The amount of manganese promoter is desirably 0.02 to 0.15 atom and preferably 0.05 to 0.10 atom per atom of copper. In addition to the chromium in the copper chromite, it is advantageous and preferred to add additional chromium, up to 0.5 atom per atom of manganese. Hence, the range of added chromium is 0 to 0.5 atom per atom of manganese. The advantage of added chromium is to increase catalytic activity; i.e., rate of reduction of the ester as will hereinafter be demonstrated.

The supported catalyst also is a copper-containing manganese promoted catalyst. The support is aluminum oxide, Al$_2$O$_3$, whose alkali metal content is low, 0.5% by weight or lower. It is also desirable that the support have a large surface area per unit of weight, 100 square meters per gram and above. Preferably the aluminum oxide surface area should be in excess of 150 square meters per gram. For these supported catalysts, any of the commercially available activated aluminas including uncalcined alumina beta-trihydrate are suitable. The copper content of the supported catalyst, calculated as copper oxide (CuO), is desirably in the range of 5 to 20%, preferably in the range of 8 to 15% copper oxide as weight percent based on the support. The manganese promoter to be employed is desirably in the range of 0.05 to 1.0 atom of manganese, preferably 0.2 to 0.8 atom of manganese per atom of copper. Here again it is advantageous to employ chromium as it enhances the promoter effect of manganese. More than 0.5 atom of chromium does not appear to enhance the promotional effect of manganese. The chromium in copper chromite, if such be the source of the copper for the supported copper-containing catalyst, again does not satisfy the enhancement of the promotional effect of manganese, for to achieve the enhanced promotional effect of manganese, additional chromium in an amount of up to 0.5 atom per atom of manganese is necessary to obtain its benefits. Hence, for the supported copper-containing catalyst the range of added chromium is desirably 0 to 0.5 and preferably 0.2 to 0.4 atom of chromium per atom of manganese.

In general, the catalyst is prepared by combining salts, oxides, and hydroxides of the metal components, with or without the support, calcining the resulting mixture and reducing the calcined mixture until at least the copper oxide is reduced. Reduction can be accomplished with any reducing agent such as hydrogen, cyclohexanol, carbon monoxide or methanol, among other reducing agents as is well known to those skilled in the art.

It is also advantageous to employ either form of the catalyst with as little absorbed water as possible. The presence of small amounts of water, especially in the reduction of alkyl benzoates to benzyl alcohol, has a marked, adverse effect on the rate of reduction as well as on the selectivity of reduction of esters of aromatic monocarboxylic acids. By employing anhydrous reactants and starting with a dry reaction apparatus, the rate of reduction is markedly greater. The drying of the solid catalyst to a suitable low-absorbed water content is readily accomplished during reduction of the mixture of metals providing the copper-containing catalyst at temperatures above 250° C. but not in excess of about 350° C., more suitably in the range of 275° to 350° C. and preferably in the range of 290 to 340° C. In addition, while cooling the reduced catalyst, it is advantageous to cool in the presence of the reducing means such as hydrogen, carbon monoxide and methanol to a temperature of about 150° C. and thereafter cool in the presence of nitrogen. This aids in the removal of water absorbed by the metal oxide components of the catalyst.

It is also advantageous to carry out the reduction of the esters of aromatic monocarboxylic acids employing the catalyst of the process of this invention by employing an agent to scavenge water produced by the reaction.

The process of this invention can be carried out by dispersing the catalyst in a finely-divided form in the ester in the liquid phase, molten ester if it is normally a solid. However, by the use of a reaction solvent, especially an alcohol, the rate and selectivity of the reduction is markedly enhanced. Suitable reaction solvents are the saturated aliphatic alcohols, desirably the alkanols and preferably the alkanol corresponding to the alcohol by-product split off from the ester group. Where the alcohol residue of the ester is from a higher alcohol; i.e., from 6 to 12 carbon atoms, it is preferred that a lower alkanol be employed at least for startup or initial operations and thereafter employ as the solvent the alcohol split out. To employ as the solvent the alcohol by-product split off during reduction simplifies the separation and recovery of the primary alcohol produced by the reduction of the acid portion of the ester. Ethers can also be used as reaction solvents, for example diethyl ether and dioxane. However, the use of a particular solvent is not critical insofar as the selectivity of the process of this invention is concerned, and the selection of the solvent is a matter of choice fully within the skill of the chemist.

The essence of this invention lies in the discovery of the use of the highly selective copper-containing catalyst hereinbefore defined in the liquid phase reduction with hydrogen of the esters of aromatic monocarboxylic acids also hereinbefore defined. The precise means for combining the necessary metal components of the copper-containing catalyst are not material.

The unsupported copper-containing catalyst can be conveniently prepared by kneading a manganese nitrate water solution with a commercially available copper chromite powder to a thick paste. The added chromium, when desired to enhance the promotional effect of manganese, is also kneaded in as $CrO_3$ or $Cr(NO_3)_3$ or some other soluble form of chromium at the same time. The resulting mixture is dried, calcined and used in a powdered or pilled form. The manganese and also the added chromium can be incorporated with copper chromite in thermally decomposable forms other than the nitrates to avoid the evolution of corrosive $NO_2$ fumes during the calcining step. For example, a mixture of manganese carbonate in chromic acid providing the desired amount of manganese and ratio of added chromium to manganese can be kneaded with copper chromite. Also the metals can be combined by co-precipitation techniques in which suitable ratios of copper, manganes, chromate and chromium are present in an acid solution and precipitated with controlled addition of ammonia. The precipitate is recovered, dried and calcined.

A convenient method for preparing the supported copper-containing catalyst is to knead the alumina with amounts of thermally decomposable copper, manganese and chromium compound or copper chromite and thermally decomposable manganese and chromium compounds with sufficient water to make a uniform, thick paste or dough. The mixture is dried and calcined. Also the above-described co-precipitate as a suitable wet slurry can be kneaded with the alumina, then dried and calcined. Also the copper chromite manganese carbonate and chromic acid mixture can be kneaded with alumina, dried and calcined.

Any other techniques known to the art for combining the metal components of the catalyst used in the process of this invention may be employed. The calcining of the mixture of metals providing the catalyst used in the process of this invention is carried out at temperatures in the range of 400 to 550° C. The precise temperature is not critical nor is the time held at any of these temperatures critical. It is desirable to calcine these mixtures to have the metals in oxide forms. By "oxide forms" is meant the oxides of the metals per se as well as in such combinations as copper chromite and manganese chromite. For convenience of description some or all of the metal components are sometimes referred to as being in their oxide form even though they may be combined. For example, when a copper chromite is employed to prepare the catalyst, it is desirable to use a copper chromite containing copper in an amount equivalent to a copper oxide (CuO) content of about 35 to 90%. Also as the unsupported catalyst the components can be in the range of from 35 to 90% copper oxide (CuO), 2 to 64.9% chromium oxide ($Cr_2O_3$) and manganese oxide (MnO) of from 0.1% to 20%. However, it is preferred to define the catalyst used on the basis of atoms per atom as hereinbefore employed, since after calcining the mixture is reduced with hydrogen.

The copper-containing catalyst of this invention can be utilized in the reduction of esters of aromatic carboxylic acids in many forms. For example, after calcining, the mixture of metals can be ground to a powder before being reduced. Also, the dried mixture can be granulated, formed into pellets or pills, calcined and then reduced. Other techniques of preparing various physical forms of solid catalysts varying from powder to pills known to the art of solid catalyst preparation can be employed.

All forms of catalyst employed in the process of this invention are reduced at an elevated temperature, suitably above 250° C. but not exceeding 350° C., desirably in the range of from 275 to 350° C. and preferably in the range of from 290 to 340° C. Reducing the metal mixture above 350° C. greatly reduces the activity of the catalyst. Any convenient technique for reduction can be employed. The use of hydrogen generally is preferred. Use of pure hydrogen initially causes a rapid exothermic reaction whose temperature is difficult to control and temperatures in excess of 350° C. are reached which have a deleterious effect on the catalyst. It is also preferred to reduce with a stream of hydrogen-containing gas, also containing an inert diluent such as nitrogen, methane, etc., at about one atmosphere starting with a mixture of 10 to 30 or more parts by volume of inert diluent to 1 of hydrogen. It is also preferred, not essential, to reduce the inert content of the gas until pure hydrogen is used, especially at the temperatures above 250° C., for by then the major portion of the reduction has occurred and the use of less diluent hydrogen speeds up the final reduction of the metal components. The lower hydrogen content is started well below 250° C. when first heating the metal mixture to be reduced. Thereafter the hydrogen content is increased to provide not more than about a 20 to 30° C. rise in temperature.

The ester reduction process of this invention can be carried out as a batch process or in a continuous flow system which, of course, is more suitable for commercial application of the process, as, for example, in countercurrent contact in a tower packed with 3/16" catalyst pellets charging the solvent ester solution to the top and hydrogen to the bottom. The process of this invention will be hereinafter illustrated by specific examples which are intended to exemplify to those skilled in the art how to carry out the process and to demonstrate the selectivity of the process rather than to impose thereon any limitation.

For the purpose of comparing the results obtained from the process of this invention with the closest prior process the results obtained by the reductions of methyl benzoate in methanol using a coppor chromite (82% CuO) promoted with O, 2%, 5% and 10% calcium oxide calcined at 450° C. and treated with hydrogen at 300° C. are given. A stirred stainless steel 100 ml. Magne-Dash autoclave is charged with 0.05 mole redistilled methyl benzoate, 1.0 mole methanol and 2.0 grams of copper chromite catalyst while purging air with an inert oxygen-free gas such as hydrogen or nitrogen and mixtures thereof. The autoclave is sealed, and the reaction mixture is stirred. Hydrogen is charged to 1500 p.s.i.g. and the reaction mixture is heated to 120° C. with stirring and is maintained at this temperature until 40 to 60% of the esters are converted. Reaction is very slow after this. Thereafter the autoclave contents are cooled to 25° C., the excess hydrogen removed and the reaction mixture is subjected to gas chromatographic analysis at 175° C. using Hercoflex 600 (a pentaerythritol ester) in Celite. It is found that at 40 percent conversion of methyl benzoate, the benzyl alcohol yield is 75% and the toluene yield is 25%. When carried to 60% conversion the benzyl alcohol yield drops to 47%, and the hydrocarbon yield increases to 40%. Since the yield of benzyl alcohol decreases during the course of this reaction, the yield of benzyl alcohol at 50% conversion of methyl benzoate is determined as a convenient standard for comparison. The reduction reaction is followed by periodically withdrawing samples for gas chromatographic analysis.

Again for comparison, repeating the above reduction with a copper chromite containing 40% CuO calcined at 450° C. and reduced with hydrogen at 300° C., methyl benzoate reduced in the presence of this catalyst at 182° C. for 6 hours and 1250 p.s.i.g. hydrogen gives a total conversion of 64% but only 3% goes to benzyl alcohol and the remainder goes mostly to toluene. At 137° C. and 22 hours the conversion is only 47%, of which 13% goes to benzyl alcohol and the remainder goes to toluene.

EXAMPLE 1

A catalyst is prepared from copper chromite containing 82% CuO and from manganese nitrate to provide 5% manganese oxide by weight. This mixture is calcined at 450° C. and reduced with hydrogen up to 300° C. To the 100 ml. Magne-Dash stainless autoclave there are charged 6.5 grams of the reduced catalyst, 46 ml. reagent grade methanol and 0.05 mole of redistilled methyl benzoate. Air is purged from the autoclave which is then pressurized to 1200 p.s.i.g. with hydrogen. The autoclave contents are heated to 120° C. with stirring. A pressure drop is noted at 70° C. A sample taken after 1.5 hours for gas chromatographic analysis shows 25.3% reduction of the ester, 23.1% going to benzyl alcohol and 2.2% to toluene. Thus, the benzyl alcohol yield is 92%. At 50% conversion the yield of benzyl alcohol is 80%. After 19 hours of reaction, the total conversion of the ester is 45.4% of which 35.7 is to benzly alcohol and 7.9% to toluene for a total yield of benzyl alcohol of 83%.

EXAMPLE 2

The process of Example 1 is repeated except that 0.05 mole of water is added. The rate of reaction was drastically reduced to 9% in 20 hours and the selectivity was shifted sharply from benzyl alcohol toward toluene.

EXAMPLE 3

The process of Example 1 is repeated except that the methanol is anhydrous and the autoclave is dried. The hydrogenation by this process is faster, 49% conversion in 5 hours with a yield of benzyl alcohol of 77%.

EXAMPLES 4 AND 5

The process of Example 1 is twice repeated using 2.0 grams and 1.2 grams of catalyst. The yields of benzyl alcohol at 50% conversion of the ester are 82% and 80%, respectively.

EXAMPLE 6

The process of Example 1 is repeated except that 6.4 grams of catalyst are employed and the reaction temperature is 70° C. The yield of benzyl alcohol at 50% conversion is 93%, although the rate of reaction is much slower.

EXAMPLE 7

The process of Example 1 is repeated except that 2.2 grams of calcined and reduced catalyst containing 82% CuO based on the copper chromite, 5% MnO and 2.5% $CrO_3$ are employed. The benzyl alcohol yield at 50% conversion is 83% with a total conversion of 44% in 5 hours.

EXAMPLES 8 TO 10

The process of Example 1 is repeated except that the calcined and reduced catalysts are 11% CuO on $Al_2O_3$ impregnated with 2.5% $CrO_3$ and 5% (Example 8) and 10% MnO (Example 9) and 11% CuO on $Al_2O_3$ impregnated with 2% MnO and 2.5% $Na_2CrO_4$ (Example 10). Of the first two catalysts 2.2 grams of each are employed. The third catalyst is employed in the amount of 6.0 grams. The benzyl alcohol yield at 50% conversion and total conversion in 5 hours are tabulated below:

*Benzyl alcohol from methyl benzoate*

| Example No. | Catalyst, Grams | Benzyl Alcohol at 50% Conversion | Total Conversion in 5 Hours, percent |
|---|---|---|---|
| 8 | 2.2 | 93 | 38 |
| 9 | 2.2 | 82 | 20 |
| 10 | 6.0 | 73 | 23 |

For comparison with Examples 8 to 10 the results of the following are given. Example 1 is repeated using as the calcined and reduced catalyst 5.8 grams of 11% CuO on $Al_2O_3$ and 2.1 grams of 11% CuO on $Al_2O_3$ impregnated with 2% MnO. The results of these two hydrogenations are given below.

| Catalyst | | Yield Benzyl Alcohol at 50% Conversion | Total Conversion in 5 Hours |
|---|---|---|---|
| CuO on Al₂O₃ | Grams | | |
| 11% CuO | 5.8 | 68 | 13 |
| 11% CuO and 2% MnO | 2.1 | 65 | 17 |

These results compared to those of Examples 8 to 10 show the marked improvement by the process of this invention.

The processes of Examples 1 to 10, when carried out in the presence of ethanol instead of methanol, produce substantially equivalent results.

The process of this invention is useful for preparing benzyl alcohol from: ethyl benzoate in ethanol, n-propyl benzoate in n-propanol, isopropyl benzoate in isopropanol, amyl benzoate in amyl alcohol, octyl benzoate in octyl alcohol, 2-ethylhexyl benzoate in 2-ethyl hexanol, and dodecyl benzoate in dodecyl alcohol. As hereinbefore pointed out, other alcohol solvents can be employed. Similarly, the process of this invention can be employed to produce o-, m- and p-methyl benzyl alcohol from methyl, ethyl, propyl, butyl, hexyl, octyl and dodecyl o-, m- and p-toluates. Phenyl-benzyl alcohols such as 4-diphenyl methanol are prepared from methyl diphenyl-4-carboxylate. Naphthyl-methanols are prepared from methyl naphthoate. The production of other primary aromatic alcohols by the process of this invention will be apparent to those skilled in the art.

EXAMPLE 11

The process of this invention can be carried out as a continuous process in the following manner. A tower having a liquid inlet at the top, a gas inlet and a liquid discharge at the bottom is packed with a calcined mixture of metals of the composition described in any of Examples 1, 4, 5, 7, 8, 9 and 10 formed as 3/16" pellets. The catalyst pellets are reduced with hydrogen, beginning with hydrogen diluted with about 20 volumes of nitrogen at a bed temperature of 50° C. and heating the bed externally until the reduction is self-sustaining. The nitrogen content is reduced in steps so as to achieve no more than a 25° C. increase in bed temperature until the bed temperature is 300° C. The reduction is completed with hydrogen only. With the liquid inlet valve and the discharge valve closed, the tower is pressured with hydrogen to 4000 p.s.i.g. The catalyst bed is cooled in the presence of hydrogen to 140° C. Thereafter a solution containing dry methanol and methyl benzoate in the ratio of two moles of methanol per mole of ester is charged to the top of the catalyst bed at a rate to provide a contact time of from 0.5 to 5 hours depending on the reduction rate activity of the catalyst. Thereafter liquid is withdrawn from the bottom and flashed to remove methanol. The residue is distilled to recover benzyl alcohol.

By use of the most active catalyst of this invention 90% conversion of methyl benzoate and 90% yield of benzyl alcohol can be achieved.

What is claimed is:

1. A process for the reduction of an ester of an aromatic monocarboxylic acid to the corresponding primary alcohol without substantial reduction of the carboxyl group residue of said ester to a methyl group which comprises reducing with hydrogen at a temperature in the range of 70 to 180° C. and a pressure to maintain a liquid phase an aromatic compound of the formula Ar—COOR wherein Ar is an aromatic group and R is an alkyl hydrocarbon group of 1 to 12 carbon atoms in the presence of a solid, copper-containing catalyst consisting essentially of the elements copper, chromium and manganese in the ratio of 0.01 to 1.0 atom of chromium and 0.01 to 1.0 atom of manganese per atom of copper derived from the reduction of the oxide form of a mixture containing said elements in said atom ratios at a temperature above 250° C. up to 350° C. until at least the copper oxide is reduced.

2. The process of claim 1 wherein the solid, copper-containing catalyst is derived by the reduction at a temperature above 250° C. up to 350° C. of the calcined mixture of a copper chromite containing from 0.1 to 1.0 atom of chromium per atom of copper and an amount of thermally decomposable manganese compound to provide from 0.01 to 1.0 atom of manganese per atom of copper until at least the copper oxide of the copper chromite is reduced.

3. The process of claim 1 wherein the solid, copper-containing catalyst is derived by reducing at a temperature of above 250° C. up to 350° C. of a calcined mixture of a copper chromite containing from 0.1 to 1.0 atom of chromium per atom of copper and an amount of thermally decomposable manganese compound to provide 0.01 atom of manganese per atom of copper and an additional amount of chromium added as thermally decomposable chromium compound above that present in said copper chromite to provide the range of from 0.01 to 0.5 atom of chromium per atom of manganese.

4. The process of claim 1 wherein the solid, copper-containing catalyst is supported on aluminum oxide containing less than 0.5% by weight alkali metal obtained by reducing at a tempreature of above 250° C. up to 350° C. a mixture of oxide form of copper, chromium and manganese deposited on said aluminum oxide in an amount to provide from 5 to 20 percent copper oxide by weight based on aluminum oxide and from 0.01 to 1.0 atom of manganese and 0.01 to 1.0 atom of chromium per atom of copper until at least the copper oxide is reduced.

5. The process for the reduction of an alkyl ester of benzoic acid wherein the alkyl group is a hydrocarbon group of from 1 to 12 carbon atoms to benzyl alcohol without substantial production of toluene which comprises reducing said ester of benzoic acid with hydrogen at a temperature of from 70° to 180° C. and a pressure to maintain a liquid phase in the presence of a solid, copper-containing catalyst derived from the calcination of a mixture of a copper chromite containing 0.125 to 0.5 atom of chromium per atom of copper with thermally decomposable compounds of manganese and chromium in amounts to provide from 0.5 to 0.1 atom of manganese per atom of copper and from 0.2 to 0.4 atom of chromium per atom of manganese followed by reduction with hydrogen at a temperature above 250° C. not exceeding 350° C. until at least the copper oxide content of copper chromite is reduced prior to reduction of said benzoate.

6. The process of claim 5 wherein the atom ratio of chromium to copper in copper chromite is 0.165 to 0.2.

7. The process of claim 5 wherein the alkyl ester is methyl benzoate.

8. The process of claim 7 wherein the temperature is 120° to 140° C. and the pressure is 3000 to 5000 p.s.i.g.

9. The process for the reduction of an alkyl ester of benzoic acid wherein the alkyl group is a hydrocarbon group of from 1 to 12 carbon atoms to benzyl alcohol without substantial production of toluene which comprises reducing said ester of benzoic acid with hydrogen at a temperature in the range of 70 to 180° C. and a pressure to maintain a liquid phase in the presence of a solid, copper-containing catalyst supported on aluminum oxide containing less than 0.5% by weight alkali metal obtained by reducing at a temperature of above 250° C. up to 350° C. a mixture of oxide form of copper, chromium and manganese deposited on said aluminum oxide in an amount to provide copper oxide of from 8 to 15% by weight of the aluminum oxide and from 0.2 to 0.5 atom of manganese per atom of copper and from 0.2 to 0.4 atom of chromium per atom of manganese until at least the copper oxide is reduced.

10. The process of claim 9 wherein the ester to be reduced is methyl benzoate.

11. The process of claim 10 wherein the temperature is 120° to 140° C. and the pressure is 3000 to 4000 p.s.i.g.

References Cited by the Examiner

UNITED STATES PATENTS

| | | | |
|---|---|---|---|
| 1,889,672 | 11/32 | Larson | 260—467 X |
| 1,902,160 | 3/33 | Frazer et al. | 260—467 X |
| 1,939,708 | 12/33 | Larson | 260—467 X |
| 2,040,913 | 5/36 | Amend | 260—618 |
| 2,079,414 | 5/37 | Lazier | 260—618 |
| 2,098,206 | 11/37 | Hartung et al. | 260—618 |
| 2,118,007 | 5/38 | Covert et al. | 260—618 X |
| 2,855,370 | 10/58 | Lundsted | 252—467 |
| 2,865,868 | 12/58 | McKinley et al. | 252—467 |

OTHER REFERENCES

Mozingo et al.: "Jour. Amer. Chem. Soc.," vol. 70 (1948), pp. 229–231.

LEON ZITVER, *Primary Examiner.*

CHARLES B. PARKER, *Examiner.*